US011265521B2

(12) United States Patent
Shi et al.

(10) Patent No.: US 11,265,521 B2
(45) Date of Patent: Mar. 1, 2022

(54) DIGITAL LIGHT PROCESSING PROJECTOR

(71) Applicant: Hisense Laser Display Co., Ltd., Shandong (CN)

(72) Inventors: Longfei Shi, Shandong (CN); Yongda Huang, Shandong (CN); Naiwen Hou, Shandong (CN); Jianjun Li, Shandong (CN)

(73) Assignee: Hisense Laser Display Co., Ltd., Qingdao (CN)

( * ) Notice: Subject to any disclaimer, the term of this patent is extended or adjusted under 35 U.S.C. 154(b) by 216 days.

(21) Appl. No.: 16/655,912

(22) Filed: Oct. 17, 2019

(65) Prior Publication Data
US 2020/0336712 A1 Oct. 22, 2020

Related U.S. Application Data

(63) Continuation of application No. PCT/CN2019/093633, filed on Jun. 28, 2019.

(30) Foreign Application Priority Data

Apr. 18, 2019 (CN) .......................... 201910327640.6

(51) Int. Cl.
*H04N 9/31* (2006.01)
*G03B 21/00* (2006.01)
(Continued)

(52) U.S. Cl.
CPC ......... *H04N 9/3111* (2013.01); *G03B 21/008* (2013.01); *G03B 21/145* (2013.01); *H04N 9/315* (2013.01); *G03B 21/2033* (2013.01)

(58) Field of Classification Search
None
See application file for complete search history.

(56) References Cited

U.S. PATENT DOCUMENTS

2005/0265001 A1* 12/2005 Saito .................. H01L 23/4006
361/710
2006/0176453 A1* 8/2006 Miyamoto ............. G03B 21/16
353/119
2016/0295180 A1 10/2016 Yu et al.

FOREIGN PATENT DOCUMENTS

| CN | 101221347 A | 7/2008 |
|---|---|---|
| CN | 205787359 U | 12/2016 |
| CN | 107329232 A | 11/2017 |

OTHER PUBLICATIONS

State Intellectual Property Office of the People's Republic of China Office Action and Search Report issued in Chinese Application No. 201910327640.6, dated Nov. 28, 2019, pp. 1-17, Beijing, China.

* cited by examiner

*Primary Examiner* — Michelle M Iacoletti
*Assistant Examiner* — Danell L Owens
(74) *Attorney, Agent, or Firm* — Hauptman Ham, LLP

(57) ABSTRACT

A digital light processing projector includes a light machine having a shell. The shell is provided with a first positioning post and a second positioning post. A digital micromirror device is configured with a first positioning hole and a second positioning hole. The first positioning post is located in the first positioning hole. The second positioning post is located in the second positioning hole. The light machine includes a circuit board assembly, a pressing plate, and a first connection assembly for fixed connection with the shell, and fixation of the pressing plate, the circuit board assembly and the digital micromirror device on the shell.

19 Claims, 13 Drawing Sheets

(51) Int. Cl.
*G03B 21/14* (2006.01)
*G03B 21/20* (2006.01)

DIGITAL LIGHT PROCESSING PROJECTOR

CROSS-REFERENCE TO RELATED APPLICATIONS

This application is a continuation application of International Application No. PCT/CN2019/093633 filed on Jun. 28, 2019, which claims priority to Chinese Patent Application No. 201910327640.6 filed on Apr. 18, 2019, the entireties of which are incorporated herein by reference.

TECHNICAL FIELD

The embodiments discussed in the present disclosure relate to the field of projection technology, and in particular to a digital light processing projector and a fixing structure of a digital micromirror device of the digital light processing projector.

BACKGROUND

Digital Light Processing (DLP) is a technology for displaying visual digital information based on Digital Micromirror Device (DMD). The digital micromirror device is composed with a plurality of micromirrors, and each micromirror can be rotated by a certain angle. The operating principle of the digital light processing projector is to project the primary color light beam emitted by the light source onto the micromirrors of the digital micromirror devices, with one micromirror equivalent to one pixel unit. After being processed, the video signal acts on the digital micromirror device to control the micromirror to rotate along with the signal. The light beams may be reflected into the projection lens or away from the projection lens, and the incident light beams are projected and imaged by the projection lens after being selectively reflected into the projection lens by the digital micromirror device. Micromirrors act as optical switches in digital light processing projectors. Digital micromirror devices are core components of digital light processing projectors. The stability of their connection to other components directly affects the projection quality of digital light processing projectors.

SUMMARY

An aspect of the present disclosure is related to a digital light processing projector, which may realize accurate positioning and installation of a digital micromirror device in the digital light processing projector.

Another aspect of the present disclosure is related to a digital light processing projector. The digital light processing projector comprises a light source device, a light machine, and a lens device. The light machine comprises a shell. The shell is provided with a first through hole. The light machine also comprises a digital micromirror device. A first surface of the digital micromirror device is provided with a mechanical abutting component. The mechanical abutting component abuts against the shell. A second surface of the digital micromirror device is disposed opposite to a first surface of the digital micromirror device. The second surface of the digital micromirror device is provided with first electrical contact points. The light machine further comprises a circuit board assembly. The circuit board assembly comprises a circuit board. A first surface of the circuit board faces the second surface of the digital micromirror device. The first surface of the circuit board is provided with second electrical contact points. The second electrical contact points are electrically connected to the first electrical contact points. The light machine additionally comprises a pressing plate. An insulative pad is disposed between the pressing plate and the circuit board. The light machine also comprises a first connection assembly for fixed connection with the shell, and fixation of the pressing plate, the circuit board assembly and the digital micromirror device on the shell, in turn.

Another aspect of the present disclosure is related to a light machine of a digital light processing projector. A light machine housing is provided with a first positioning post and a second positioning post. A digital micromirror device is provided with a first positioning hole and a first a positioning hole. The first positioning post is located in the first positioning hole, and the second positioning post is located in the second positioning hole. By directly locating the positioning holes on the digital micromirror device, the digital micromirror device is more accurately positioned, and an accurate positioning and installation of the digital micromirror device in the digital light processing projector is realized.

Figure 1A:
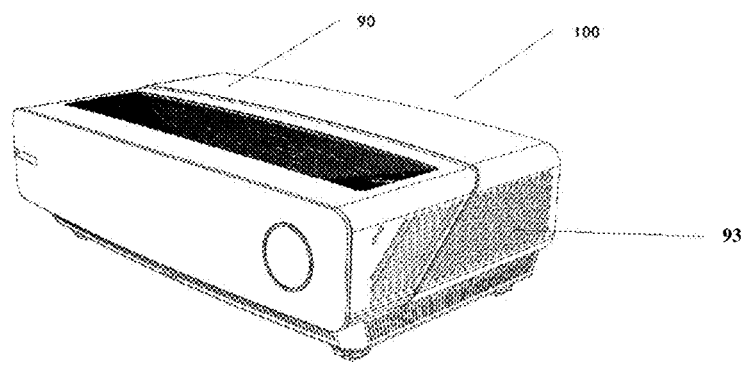
FIG. 1A is a schematic perspective view of a digital light processing projector, in accordance with one or more embodiments.

To illustrate more clearly the technical solutions in the embodiments of the present disclosure or in the prior art, the accompanying drawings required in descriptions of the embodiments or the prior art will be briefly described below. The drawings in the following descriptions are merely some embodiments of the present disclosure, and other drawings may also be obtained by those of ordinary skill in the art according to these drawings without any creative effort.

DETAILED DESCRIPTION OF THE EMBODIMENTS

The technical solutions in the following disclosure will be described clearly and completely below in combination with the accompanying drawings. The embodiments described in this section are only part, but not all, of the embodiments of the present invention. All other embodiments obtained by those skilled in the art based on the embodiments of the present invention without creative efforts are within the scope of the present invention.

In the following description, it is to be understood that orientations or positional relationships suggested by terms "center", "upper", "lower", "front", "back", "left", "right", "vertical", "horizontal", "top", "bottom", "inner", "outer" and the like are based on the orientations or positional relationships shown in the drawings, and are merely for convenience of description of the discussed embodiments and a simplified description, rather than indicating or implying the device or component referred to must have a particular orientation or is constructed and operated in a particular orientation, and thus is not to be construed as limiting the invention.

Terms "first" and "second" are used for descriptive purposes only and are not to be construed as indicating or implying a relative importance or implicitly indicating the number of technical features indicated. Thus, features modified by "first" and "second" may include one or more of such features either explicitly or implicitly. In the description below, "a plurality" means two or more unless otherwise stated.

In the following description, it should be noted that the terms "install", "join", and "connect" are to be understood broadly unless otherwise explicitly specified and defined, for example "connect" may indicate a fixed, detachable or integral connection. The specific meaning of the above terms in relation to the present invention can be understood in specific situations by those skilled in the art.

Figure 1B:
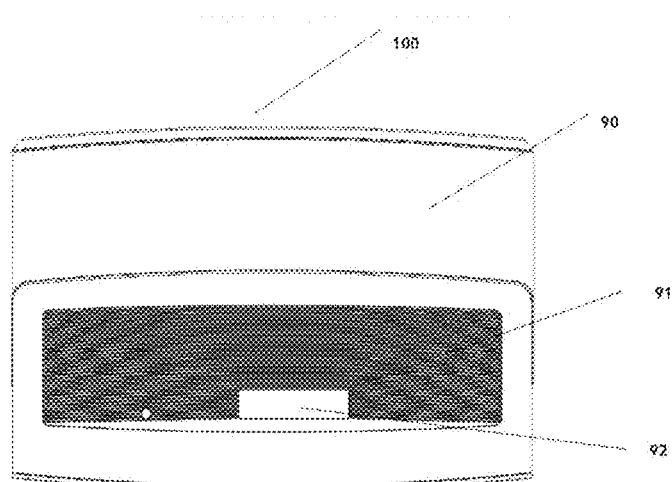
FIG. 1B is a schematic top view of a digital light processing projector, in accordance with one or more embodiments.

FIG. 1A and FIG. 1B are a schematic perspective view and a top view of a digital light processing projector in accordance with one or more embodiments. The digital light processing projector 100 has a substantially rectangular parallelepiped shape and includes a substantially rectangular parallelepiped housing 90. A projection hole 91 is disposed on the upper surface of the housing 90, and the projection hole 91 is covered with a lens cover 92. The projection hole 91 and the lens cover 92 may be used for enabling an imaging beam to be emitted from the inside of housing. In some embodiments, the projection hole 91 and the lens cover 92 may be disposed on the front side of the housing 90. In some embodiments, the projection hole 91 and the lens cover are provided in some other suitable location.

The housing 90 is provided with a plurality of through holes 93 for entry or exit of air to achieve air circulation inside the housing 90, thereby promoting heat dissipation of the internal components that may generate heat during operation. In some embodiments, the through holes 93 are provided on the left and right sidewalls of the housing 90. In some embodiments, the through holes 93 are disposed on the bottom and the rear sidewalls of the housing 90. In some embodiments, through holes 93 are provided in some other suitable location.

In some embodiments, a power button is provided on the housing 90 for turning on or off the power of the digital light processing projector.

In some embodiments, a power indicator is provided on the housing 90 to indicate whether the digital light processing projector is powered on.

In some embodiments, a projection switch is provided on the housing 90 for turning on or off the projection function.

In some embodiments, the rear sidewall of the housing 90 is provided with an input/output connector unit 71 for the disposition of USB terminal, and D-SUB terminal, S-terminal, RCA terminal and the like for image signal input, and various terminals including a power adapter plug.

Figure 2:
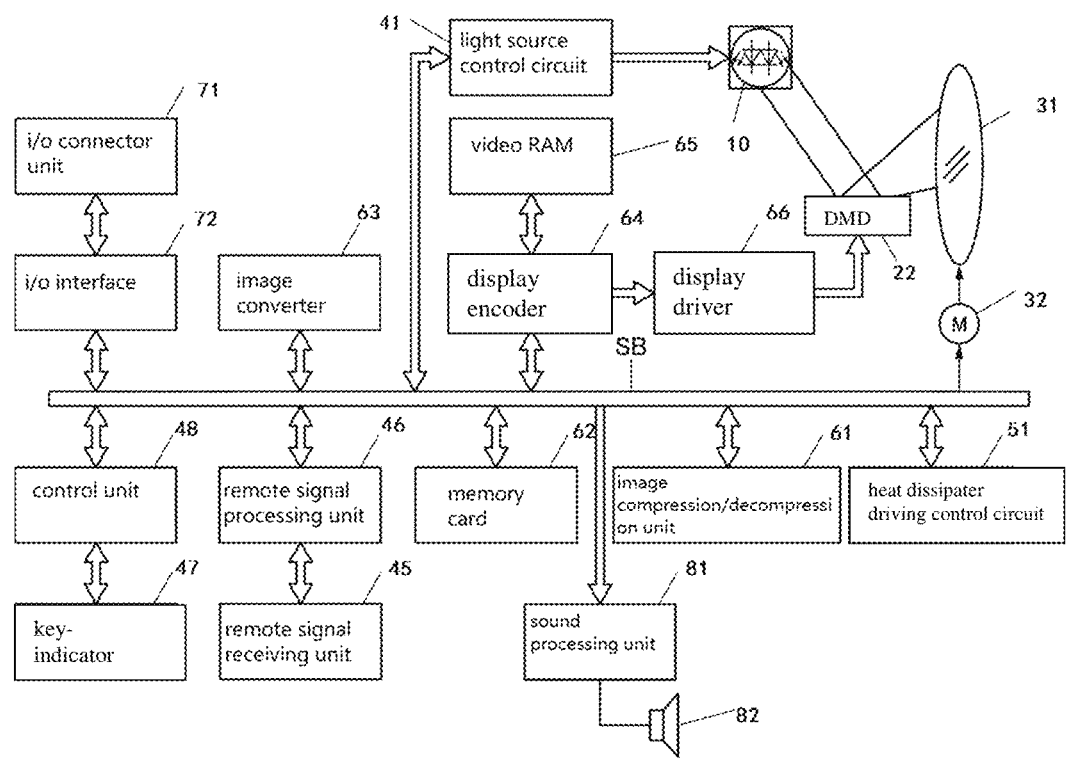
FIG. 2 is a block diagram showing the control principle of a digital light processing projector, in accordance with one or more embodiments.

FIG. 2 is a block diagram showing the control principle of a digital light processing projector in accordance with one or more embodiments.. As shown in FIG. 2, in some embodiments, the digital light processing projector includes a control unit 48, an input/output interface 72, an image converter 63, a display encoder 64, a display driver 66, and the like. Image signals of various specifications input from the input/output connector unit 71 are transmitted to the image converter 63 via the input/output interface 72 and the system bus (SB), converted by the image converter 63 into image signal in a predetermined format suitable for display, and then output to the display encoder 64.

After the input image signal is expanded and stored in a video RAM 65, the display encoder 64 generates a video signal based on the content stored in the video RAM 65, and outputs the video signal to the display driver 66.

The display driver 66 serves as a controlling mechanism for the display components. The display driver 66 drives the digital micromirror device (DMD) 22 at an appropriate frame rate in correspondence with the image signal output from the display encoder 64. Then, the digital light processing projector 100 irradiates the light beam emitted from a light source device 10 to the digital micromirror device 22 via a light guiding optical system, whereby an image is projected and displayed on a screen (not shown) via a projection side optical system to be described later by using the selective reflection of the digital micromirror device 22. Further, a movable lens assembly 31 of the projection side optical system is driven by a lens motor 32 for zoom adjustment and focus adjustment.

The image compression/decompression component 61 performs data compression on the luminance signal and the color difference signal of the image signal by processes such as encoding, and sequentially writes the compressed image date into a memory card 62 as a nonvolatile readable and writable recording medium.

Further, the image compression/decompression component 61 may read the image data recorded on the memory card 62 when in the reproduction mode, and decompress the image data. The image compression/decompression component 61 performs the following: outputting the image data to the display encoder 64 via the image converter 63, so that the image data stored in the memory card 62 may be displayed.

The controller 48 controls the operation of each of the circuits in the digital light processing projector 100. Specifically, the controller 48 may comprise a CPU, a ROM storing programs such as various settings, a RAM serving as a work memory, and the like.

Operation signals of a key-indicator 47 composed of a power button, a power indicator and the like arranged on the surface of the housing are sent to the controller 48. Operation signals from the remote controller are received by the remote signal receiver 45 via IR, Wi-Fi or the like. Code signals demodulated by the remote signal processor 46 are output to the controller 48.

The controller 48 is connected to the sound processor 81 via a system bus (SB). The sound processor 81 includes sound source circuits such as a PCM sound source circuit, and processes the sound data and drives a speaker 82 to play sound when in a projection mode and a replay mode.

Further, the controller 48 controls the light source control circuit 41 which functions as a light source control mechanism. The light source control circuit 41 controls the light source device 10 to sequentially transmit light of various primary colors. Specifically, such control includes current or voltage control of an active light-emitting component such as a laser or a light-emitting diode, as well as current or voltage control of a fluorescent wheel or a heat dissipater that may exist.

Further, based on a plurality of temperature sensors provided in the light source device 10 and the like, the controller 48 performs temperature detection on a heat dissipater driving control circuit 51, and then, based on the result of the temperature detection and the like, controls the operation state of the heat dissipater, for example, the rotation speed of the heat dissipation fan, etc. The controller 48 may also control the operating current or operating voltage of the TEC.

Figure 3A:
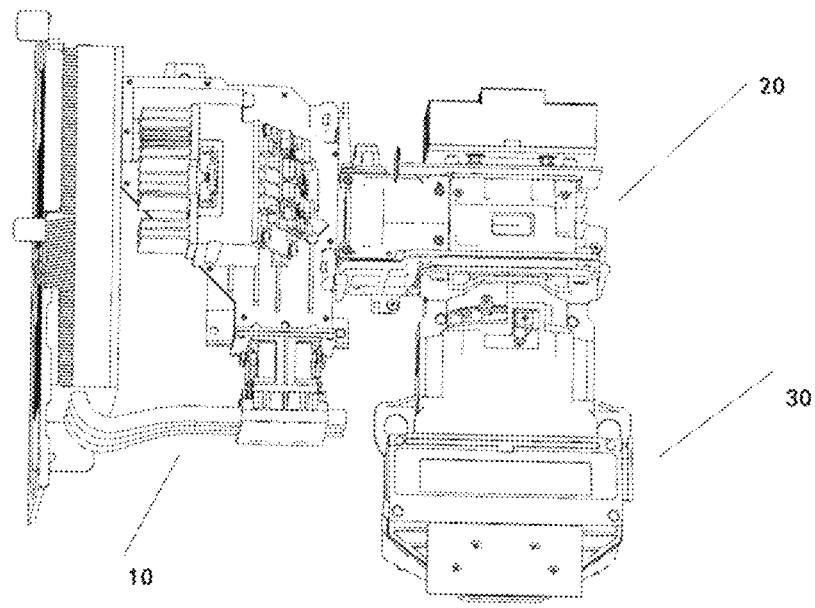
FIG. 3A is a schematic perspective view showing related optical structures inside a digital light processing projector, in accordance with one or more embodiments.
Figure 3B:
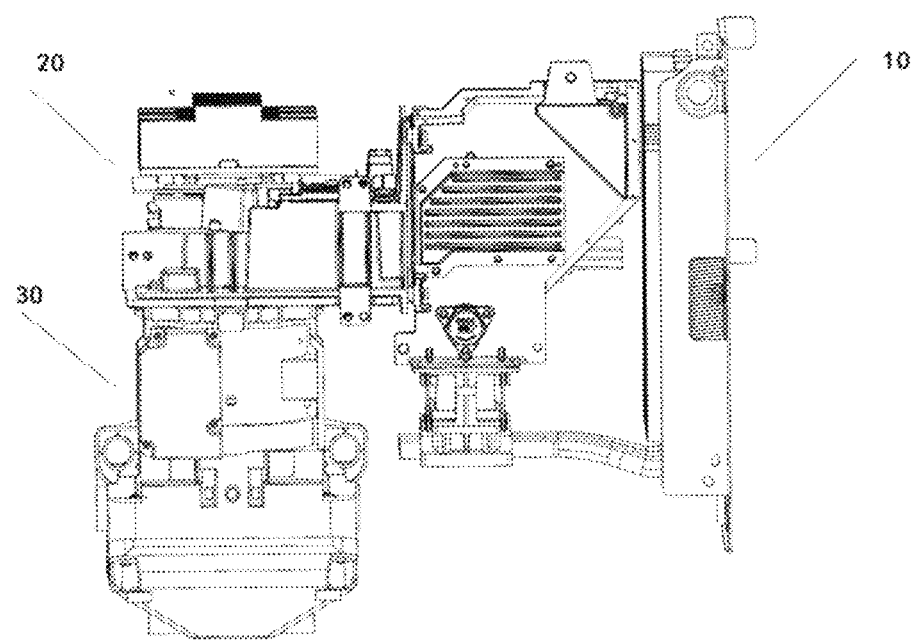
FIG. 3B is a schematic bottom view showing related optical structures inside a digital light processing projector, in accordance with one or more embodiments.
Figure 3C:
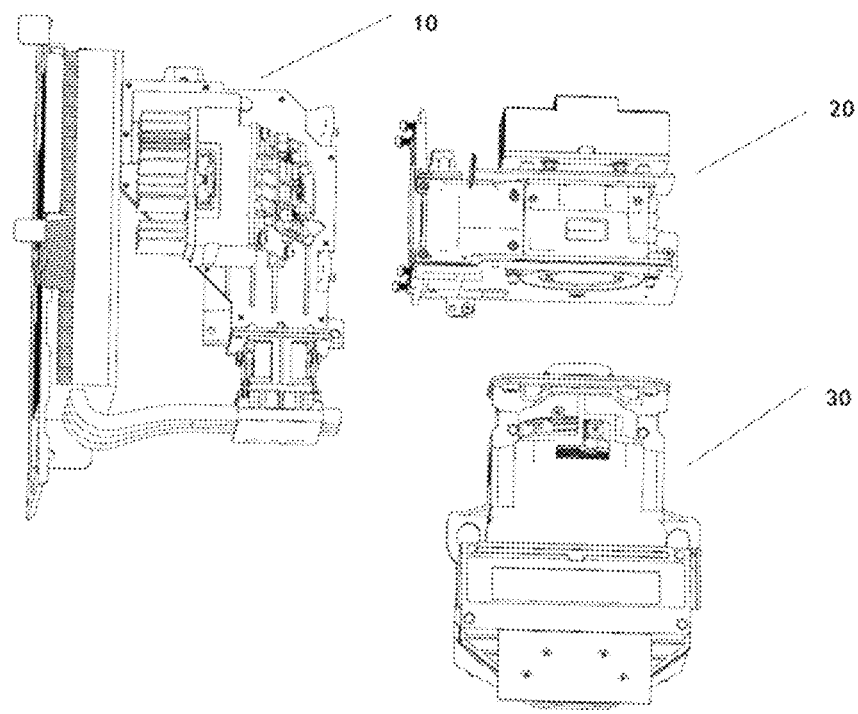
FIG. 3C is a schematic exploded view showing related optical structures inside a digital light processing projector, in accordance with one or more embodiments.

FIG. 3A, FIG. 3B and FIG. 3C are a schematic perspective view, a bottom view and an exploded view showing related optical structures inside a digital light processing projector in accordance with one or more embodiments. As shown in FIGS. 3A, 3B, and 3C, inside the housing of the digital light processing projector 100, a light source device 10, a light machine20, and a lens device 30 are provided.

The light source device 10 may be used to provide a light source for the optical system of the whole digital light processing projector 100, and may periodically provide red, green and blue light beams to the light machine 20. In some embodiments, red, green, blue, and yellow light beams may be periodically provided to the light machine 20. In some embodiments, the light source device 10 includes at least a blue laser.

The light machine 20 may be used to receive the primary color light periodically irradiated by the light source device 10 and perform spatial light modulation on the primary color light periodically irradiated by the light source device 10. Specifically, the light machine 20 includes a digital micromirror device 22 that performs spatial light modulation on the primary color light periodically irradiated by the light source device 10 in accordance with the driving signal of the display driver 66.

After spatial light modulation by the light machine 20, the light may be irradiated into the lens device 30. The lens device 30 is provided with a movable lens assembly 31 which may be driven by the lens motor 32 to perform zoom adjustment and focus adjustment. After the modulated light passes through the various optical lenses such as the movable lens assembly 31, projecting and imaging are performed through the projection hole and the lens cover 92 on the digital light processing projector housing 90.

Figure 4A:
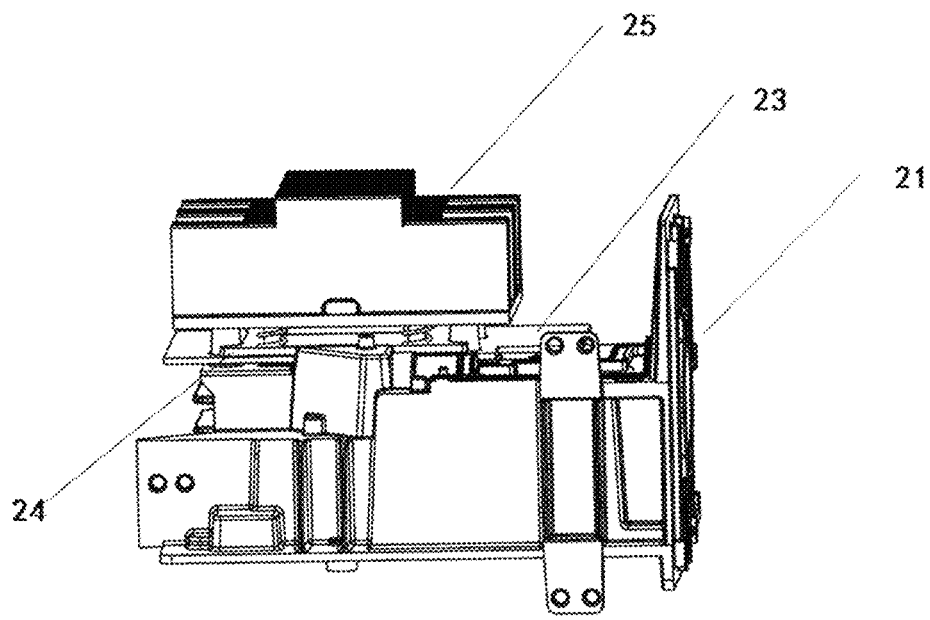
FIG. 4A is a schematic view of part of structures of a light machine of a digital light processing projector, in accordance with one or more embodiments.
Figure 4B:
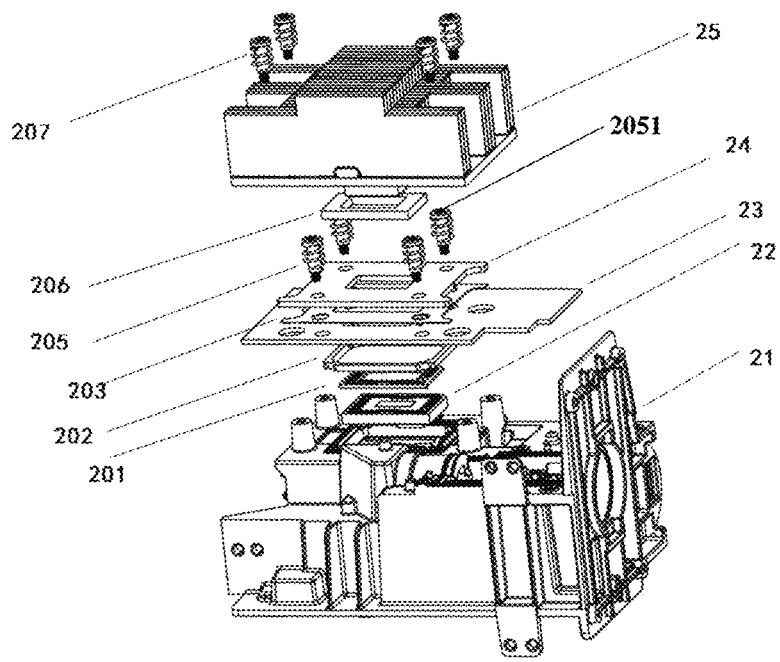
FIG. 4B is a schematic exploded view of part of structures of a light machine of a digital light processing projector, in accordance with one or more embodiments.

FIG. 4A and FIG. 4A are a schematic view and an exploded view of part of structures of a light machine of a digital light processing projector in accordance with one or more embodiments. As shown in FIG. 4A and FIG. 4B, the light machine includes a shell 21, on which a digital micromirror device 22, a circuit board assembly 23, and a pressing plate 24 are fixedly disposed in sequence. The pressing plate 24 is detachably coupled to the shell 21, and the circuit board assembly 23 and the digital micromirror device 22 are press-fitted between the pressing plate 24 and the shell 21 by the pressing plate 24.

In some embodiments, a heat dissipater 25 is also included, the heat dissipater 25 being detachably coupled to the shell 21. The heat dissipater 25 is in thermal contact with the digital micromirror device 22 and may be used to dissipate heat from the digital micromirror device 22.

Figure 5A:
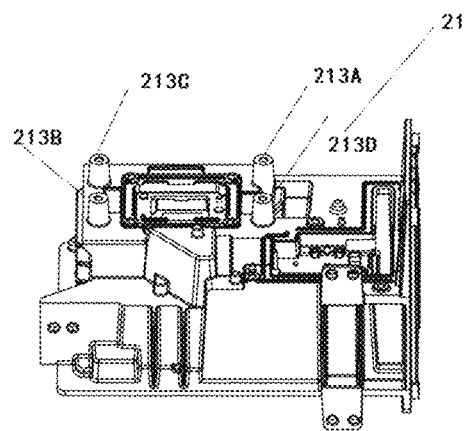
FIG. 5A is a schematic structural view of a shell of a digital light processing projector, in accordance with one or more embodiments.
Figure 5B:
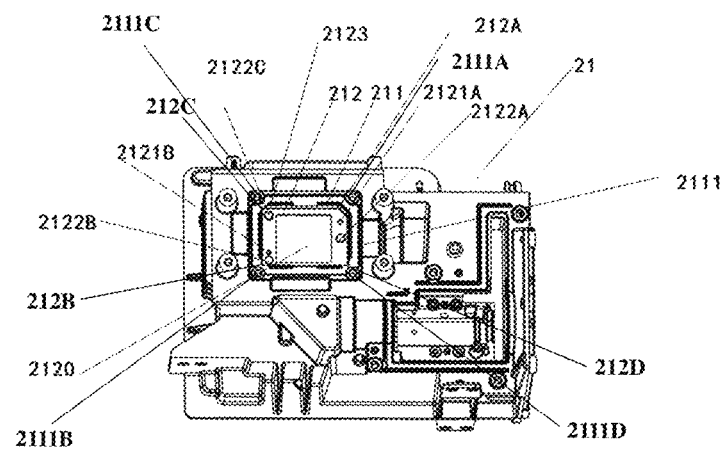
FIG. 5B is a schematic back view of a shell of a digital light processing projector, in accordance with one or more embodiments.
Figure 5C:
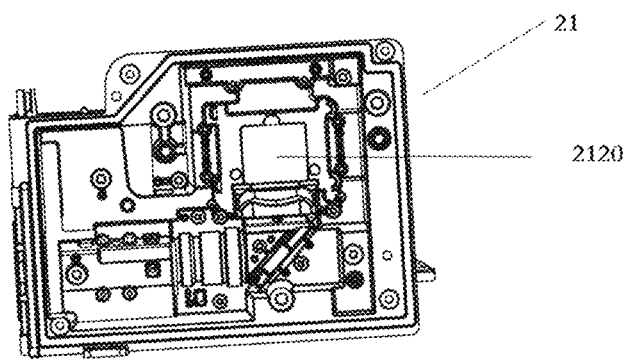
FIG. 5C is a schematic view showing structures inside a shell of a digital light processing projector, in accordance with one or more embodiments.
Figure 5D:
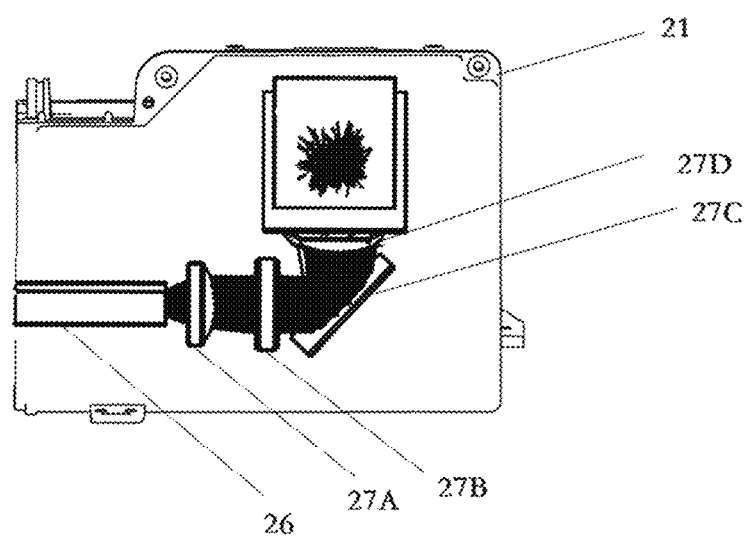
FIG. 5D is a schematic view showing optical paths inside a shell of a digital light processing projector, in accordance with one or more embodiments.
Figure 5E:
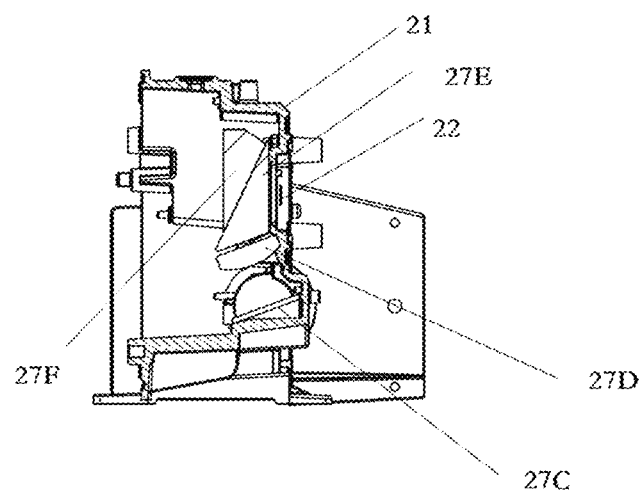
FIG. 5E is a schematic sectional view showing structures inside a shell of a digital light processing projector, in accordance with one or more embodiments.
Figure 5F:
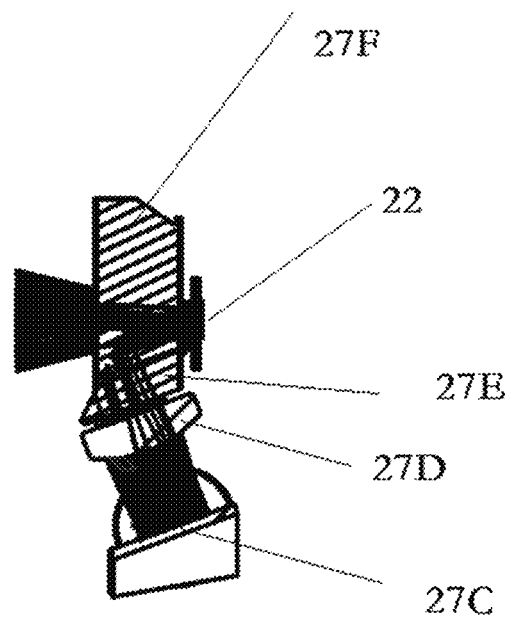
FIG. 5F is a schematic sectional view showing optical paths inside a shell of a digital light processing projector, in accordance with one or more embodiments.

FIG. 5A is a schematic structural view of a shell of a digital light processing projector in accordance with one or more embodiments. FIG. 5B is a schematic back view of a shell of a digital light processing projector in accordance with one or more embodiments. FIG. 5C is a schematic view showing structures inside a shell of a digital light processing projector in accordance with one or more embodiments. FIG. 5D is a schematic view showing optical paths inside a shell of a digital light processing projector in accordance with one or more embodiments. FIG. 5E is a schematic sectional view showing structures inside a shell of a digital light processing projector in accordance with one or more embodiments. FIG. 5F is a schematic sectional view showing optical paths inside a shell of a digital light processing projector in accordance with one or more embodiments. .

As shown in FIGS. 5D-5F, the shell 21 is provided with a digital micromirror device 22. A light homogenizer 26 and an optical lens assembly 27 is fixedly disposed inside the shell 21. The light irradiated from the light source device 10 enters the light homogenizer 26 which is used to homogenize the light beams.

In some embodiments, the optical lens assembly 27 specifically includes a first converging lens 27A, a second converging lens 27B, a reflecting mirror 27C, a third converging lens 27D, a first prism 27E and a second prism 27F.

The light homogenized by the light homogenizer 26 is irradiated through the first converging lens 27A and the second converging lens 27B to the reflecting mirror 27C, which converts the light beam from a first angle to a second angle different from the first angle.

The reflected light beam is further irradiated through the third converging lens 27D into the first prism 27E, reflected at the interface between the first prism 27E and the second prism 27F, projected out of the first prism 27E, and finally irradiated onto an inner surface of the shell 21. Specifically, the light beam is irradiated onto the digital micromirror device 22. A first surface 221 of the digital micromirror device 22 is provided with a reflective lens component 2211, which faces the interior of the digital light processing projector 100 through the first through hole 2120 and may be completely covered by a light spot, and may receive and reflect the incident light to perform spatial light modulation. The digital micromirror element 22 acts as a light switch in the digital light processing projector, and the incident light is selectively reflected by the digital micromirror device, and then projected and imaged by the projection lens.

The light selected by the digital micromirror device 22 for projection and imaging is selectively reflected by the digital micromirror device with an imaging angle, then irradiated into the first prism 27E, transmitted at the interface between the first prism 27E and the second prism 27F, and irradiated into the lens device 30. The light then passes through the various optical lenses of the movable lens assembly 31 and is finally projected and imaged through the projection hole and the lens cover 92 on the digital light processing projector housing 90.

Digital micromirror device 22 is the core component of digital light processing projectors 100. The stability of its connection with other components directly affects the projection quality of digital light processing projector 100. The fixed connection mode of the digital micromirror device 22 and related mechanisms in accordance with one or more embodiments is discussed in detail below.

As shown in FIG. 5B, in some embodiments, the exterior of the shell 21 is provided with a first groove 211, and in the first groove 211 is provided a second groove 212, and the second groove 212 is used for accommodating the digital micromirror device 22.

More specifically, the first groove 211 is substantially rectangular, and each of the four corners of the first groove 211 is provided with a screw hole for connecting with screws in a first connection assembly.

The second groove 212 is substantially rectangular, and one corner 212A is provided as a positioning chamfer for mating with the positioning chamfer 22A of the digital micromirror device 22, so that an erroneous installation of the digital micromirror device 22 is avoided and the installation efficiency is improved.

As shown in FIG. 5B, the first through hole 2120 is provided in the second groove 212 and connected to the interior of the light machine. The reflective lens component 2211 of the digital micromirror device 22 may face the interior of the digital light processing projector 100 through the first through hole 2120 to receive and reflect the incident light from the light source device.

In the second groove 212, positioning posts 2121 and abutting component 2122 are disposed around the first through hole 2120.

Specifically, a first positioning post 2121A and a second positioning post 2121B are disposed in the second groove 212. The first positioning post 2121A is disposed adjacent to the positioning chamfer 212A of the second groove 212.

The second positioning post 2121B is disposed adjacent to the opposite corner 212B of the positioning chamfer 212A. The first positioning post 2121A and the second positioning post 2121B are used to mate respectively with the first positioning hole 221A and the second positioning hole 221B provided on the first surface 221 of the digital micromirror device 22, in order to position the digital micromirror device 22.

Specifically, the first positioning post 2121A is larger in size than the second positioning post 2121B. The first positioning post 2121A is smaller in size than the positioning hole 221A. The second positioning post 2121B is smaller in size than the positioning hole 221B.

The first positioning post 2121A and the second positioning post 2121B are both cylindrical. The diameter of the cross section of the first positioning post 2121A is larger than the diameter of the cross section of the second positioning post 2121B. Preferably, the diameter of the cross section of the first positioning post 2121A is 1.90-1.97 mm, and the diameter of the cross section of the second positioning post 2121B is 1.40-1.47 mm. The diameter of the cross section of the first positioning post 2121A is larger than the diameter of the cross section of the second positioning post 2121B, which also avoids the possibility of erroneous installation to some extent.

Specifically, the second groove 212 is internally provided with abutting pads 2122. Specifically, a first abutting pad 2122A, a second abutting pad 2122B and a third abutting pad 2122C are provided, where the first abutting pad 2122A is disposed close to the connection edge between the positioning chamfer 212A and the corner 212D of the second groove 212; the second abutting pad 2122B is disposed close to the corner 212B and adjacent to the second positioning post 2121B; and the third abutting pad 2122C is disposed close to the corner 212C. The abutting pads 2122 are convex, protruding from the second groove 212, and the protruding heights are equal. The first abutting pad 2122A, the second abutting pad 2122B and the third abutting pad 2122C are triangularly arranged for abutting the first surface 221 of the digital micromirror device 22. Due to the limitations in processing, if the entire bottom of the second groove is used to support the digital micromirror device, it is difficult to ensure the flatness of a large area of the bottom, which may affect the stability of the digital micromirror device. With the three abutting pads arranged triangularly, the abutting area is reduced, so that the flatness requirement is easier to ensure, and the stress stability of the abutment is ensured by the three-point positioning.

As shown in FIG. 5A, a plurality of screw posts 213 are further provided on the exterior of the shell 21. Specifically, the screw posts 213 include a screw post 213A, a screw post 213B, a screw post 213C, and a screw post 213D. The screw posts are used for fixing the heat dissipater 25. The screw posts 213 are disposed on the outer periphery of the first groove 211.

The four corners of the first groove 211 of the shell 21 are respectively provided with screw holes 2111A, 2111B, 2111C, and 2111D, for connecting with the screws of the first connection assembly.

Recess walls are provided on the periphery of the second recess 212 of the shell 21, protruding to the first recess 211 for assisting in limiting the position of the digital micromirror device 22 during installation. At the same time, with the disposition of the recess walls, the inner side walls of the first recess 211, and the outer walls of the screw hole 2111A, the screw hole 2111B, the screw hole 2111C, and the screw hole 2111D, a space to accommodate a first sealing piece 202 is jointly defined.

Figure 6A:
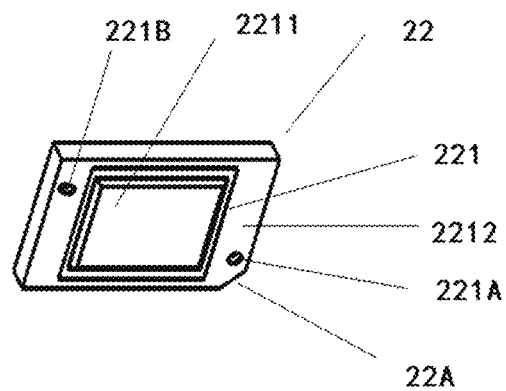
FIG. 6A is a schematic perspective structural view of a digital micromirror device of a digital light processing projector, in accordance with one or more embodiments.

FIG. 6A is a schematic perspective structural view of a digital micromirror device of a digital light processing projector in accordance with one or more embodiments. The digital micromirror device 22 abuts against the shell 21. Specifically, the first surface 221 of the digital micromirror device 22 abuts against the second groove 212 of the shell 21. As shown in FIG. 6A, the first surface 221 of the digital micromirror device 22 is provided with a reflective lens component 2211 and a mechanical abutting component 2212. The mechanical abutting component 2212 on the first surface 221 of the digital micromirror device 22 abuts against the second groove 212 of the shell 21. Specifically, the mechanical abutting component 2212 on the first surface 221 of the digital micromirror device 22 abuts against the abutting pads 2122 disposed in the second groove 212.

The first surface 221 of the digital micromirror device 22 is provided with the reflective lens component 2211 and the mechanical abutting component 2212.

The first surface 221 is provided with a reflective lens component 2211 located correspondingly to the first through hole 2120. The reflective lens component 2211 may face the interior of the digital light processing projector through the first through hole 2120, receive the incident light, and perform spatial light modulation for the light in accordance with the video signal.

Specifically, the abutment of the first surface 221 of the digital micromirror device 22 against the shell 21 may be realized by the following structure.

The digital micromirror device 22 is provided with a first positioning hole 221A and a second positioning hole 221B. Specifically, the first surface 221 of the digital micromirror device 22 is provided with a mechanical abutting component 2212, and a first positioning hole 221A and a second positioning hole 221B are provided at corresponding positions on the mechanical abutting component 2212.

Specifically, the digital micromirror device 22 is provided with a positioning chamfer corresponding to the positioning chamfer of the second groove 212. The first positioning hole 221A is disposed corresponding to the first positioning post 2121A, and is disposed at the positioning chamfer of the digital micromirror device. The second positioning hole 221B is disposed corresponding to the second positioning post 2121B. The size of the first positioning hole 221A is larger than the size of the first positioning post 2121A, and the size of the second positioning hole 221B is larger than the size of the second positioning post 2121B, in order to facilitate the assembly of the digital micromirror device. At the same time, the assembly gap between the two should not be too large, and is preferably 0.05-0.01 mm.

Specifically, the first positioning hole 221A is a circular hole with a diameter of 1.92-2.07 mm in cross section. The second positioning hole 221B is an oblong hole, and the distance between the two long sides is 1.42-1.57 mm. The oblong hole has a certain moving space in the length direction, which is convenient for installation. At the same time, the length direction of the second positioning hole 221B is not parallel to the edge of the chamfer of the second groove 212, thereby avoiding the problem of a reduced limitation accuracy after installation.

After the circuit board assembly 23 and the DMD 22 are fixedly assembled by the pressing plate, the first positioning post 2121A is located in the first positioning hole 221A, and the second positioning post 2121B is located in the second positioning hole 221B. The mechanical abutting component 2212 abuts against the first abutting pad 2122A, the second abutting pad 2122B, and the third abutting pad 2122C.

In some embodiments, the first positioning hole 221A and the second positioning hole 221B may be blind holes. After the assembly is completed, the top of the first positioning post 2121A and the bottom of the first positioning hole 221A do not contact, and the top of the second positioning post 2121B and the bottom of the second positioning hole 221B do not contact. The purpose is that when the mechanical abutting component 2212 of the digital micromirror device 22 abuts against the abutting pads 2122, the stability of the digital micromirror device 22 and the shell will not be affected by the contact between the bottom of the positioning holes and the top of the positioning posts.

Figure 6B:
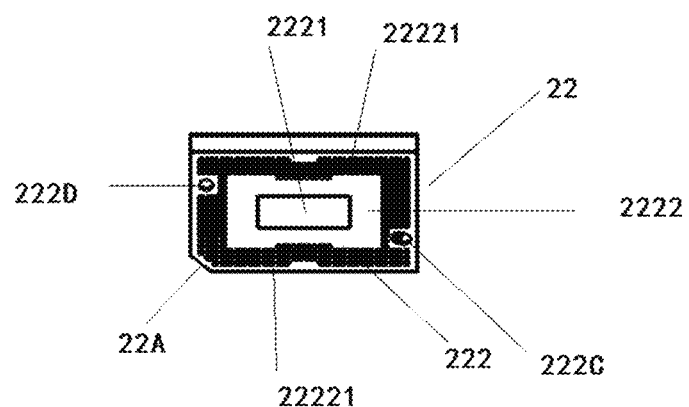
FIG. 6B is a schematic structural view showing a second surface of a digital micromirror device of a digital light processing projector, in accordance with one or more embodiments.

FIG. 6B is a schematic structural view showing a second surface of a digital micromirror device of a digital light processing projector in accordance with one or more embodiments. As shown in FIG.6B, the second surface 222 of the digital micromirror device 22 includes a mechanical abutting area 2222 and a heat dissipating area 2221. The second surface 222 is disposed opposite to the first surface 221, and the mechanical abutting area 2222 is distributed with a plurality of first electrical contact points 22221.

Figure 7A:
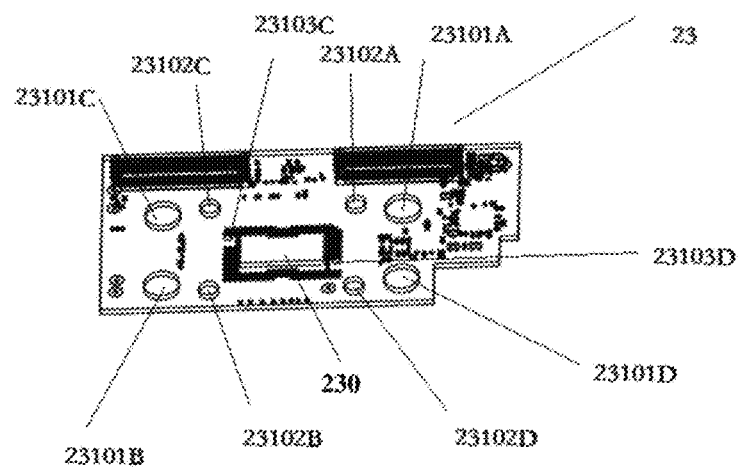
FIG. 7A is a schematic structural view of a circuit board assembly of a light machine of a digital light processing projector, in accordance with one or more embodiments.
Figure 7B:
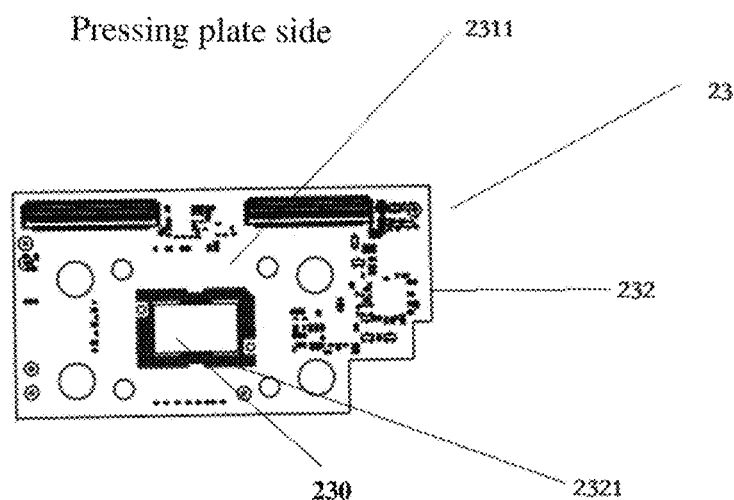
FIG. 7B is a schematic structural view of a second surface of a circuit board of a light machine of a digital light processing projector, in accordance with one or more embodiments.
Figure 7C:
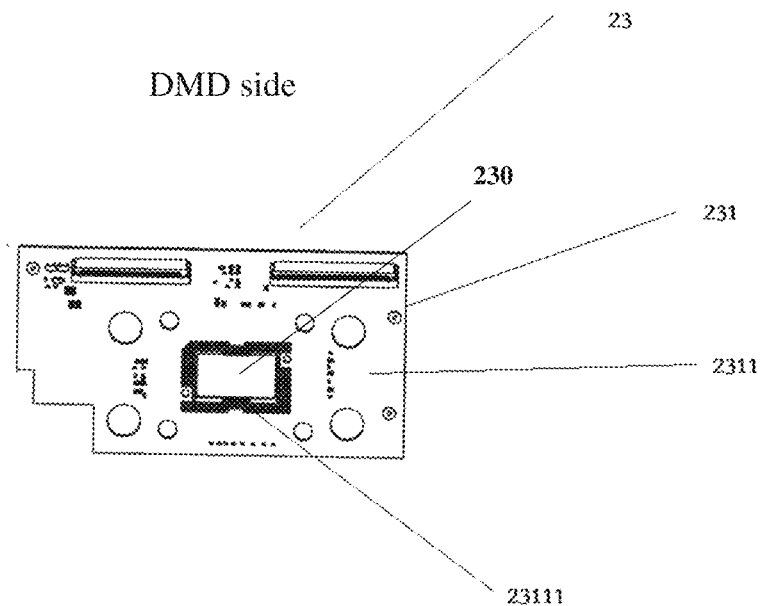
FIG. 7C is a schematic structural view of a first surface of a circuit board of a light machine of a digital light processing projector, in accordance with one or more embodiments.

FIG. 7A is a schematic structural view of a circuit board assembly of a light machine of a digital light processing projector in accordance with one or more embodiments. FIG. 7B is a schematic structural view of a second surface of a circuit board of a light machine of a digital light processing projector in accordance with one or more embodiments. FIG. 7C is a schematic structural view of a first surface of a circuit board of a light machine of a digital light processing projector in accordance with one or more embodiments.

The light machine 20 includes a circuit board assembly 23 disposed adjacent to the second surface of the digital micromirror device 22. The circuit board assembly includes a circuit board 231.

Specifically, a first surface 2311 of the circuit board faces the second surface of the digital micromirror device 22. The first surface 2311 of the circuit board is provided with a plurality of second electrical contact points 23111 corresponding to the positions of the plurality of first electrical contact points 22221, as shown in FIG.7C. The plurality of second electrical contact points 23111 are electrically connected with the plurality of first electrical contact points 22221, respectively.

In some embodiments, the light machine 20 includes an insert 201. The circuit board assembly 23, the insert 201, and the digital micromirror device 22 are disposed in stack.

The insert 201 is located between the circuit board assembly 23 and the digital micromirror device 22 for electrically connecting the plurality of second electrical contact points 23111 with the plurality of first electrical contact points 22221, respectively.

Figure 10A:
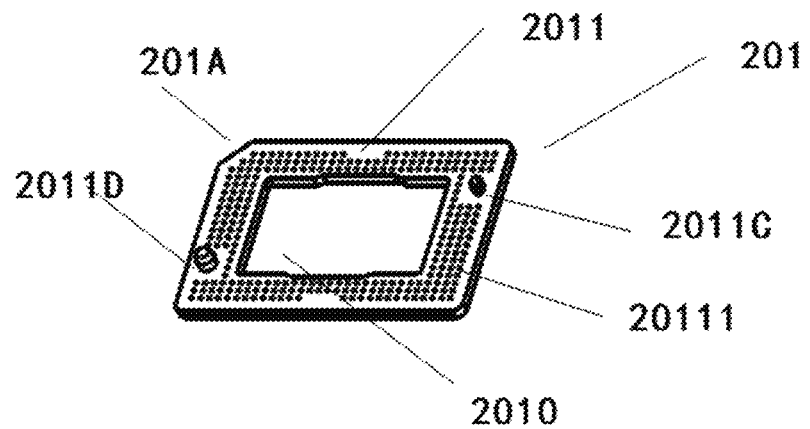
FIG. 10A is a schematic structural view of an insert of a light machine of a digital light processing projector, in accordance with one or more embodiments.
Figure 10B:
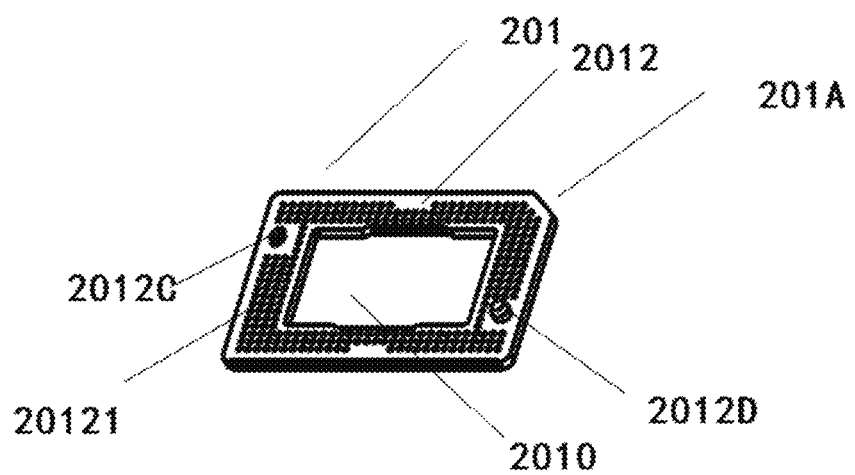
FIG. 10B is a schematic structural view of a second surface of an insert of a light machine of a digital light processing projector, in accordance with one or more embodiments.

FIG. 10A is a schematic structural view of an insert of a light machine of a digital light processing projector in accordance with one or more embodiments. FIG. 10B is a schematic structural view of a second surface of an insert of a light machine of a digital light processing projector in accordance with one or more embodiments.

Specifically, as shown in FIGS. 10A and 10B, the insert 201 includes a first surface 2011 facing the second surface 222 of the digital micromirror device 22, and a second surface 2012 facing the first surface 2311 of the circuit board 231. The first surface 2011 and the second surface 2012 are respectively provided with third electrical contact points 20111 and fourth electrical contact points 20121. The third electrical contact points 20111 provided on the first surface 2011 are electrically connected to the first electrical contact points 22221, respectively. The fourth electrical contact points 20121 provided on the second surface 2012 are electrically connected to the second electrical contact points 23111, respectively.

In some embodiments, the first electrical contact points and the third electrical contact points are in direct contact, and the second electrical contact points and the fourth electrical contact points are in direct contact.

The first surface 2011 of the insert is provided with a third positioning post 2011C and a fourth positioning post 2011D. The second surface 2012 of the insert is provided with a fifth positioning post 2012C and a sixth positioning post 2012D. Correspondingly, as shown in FIG. 6B, the digital micromirror device 22 is provided with a third positioning hole 222C and a fourth positioning hole 222D. Specifically, the second surface 222 of the digital micromirror device 22 includes a mechanical abutting area 2222, and a third positioning hole 222C and a fourth positioning hole 222D are provided at corresponding positions on the mechanical abutting area 2222. Specifically, the third positioning post 2011C and the third positioning hole 222C are correspondingly disposed, and the fourth positioning post 2011D and the fourth positioning hole 222D are correspondingly disposed.

In some embodiments, the third positioning hole 222C and the fourth positioning hole 222D are respectively disposed on two opposite corners adjacent to the positioning chamfer of the digital micromirror device 22. That is, the first positioning hole and the second positioning hole are disposed on a pair of opposite corners, and the third positioning hole and the fourth positioning hole are disposed on the other pair of opposite corners, so that the DMD is limited at all four corners to ensure more stable positioning of the DMD.

In some embodiments, the third positioning post 2011C is a prism, the third positioning hole 222C is an oblong hole, the fourth positioning post 2011D is a cylinder, and the fourth positioning hole 222D is a circular hole. The size of the third positioning hole 222C is larger than the size of the third positioning post 2011C, and the size of the fourth positioning hole 222D is larger than the size of the fourth positioning post 2011D, in order to facilitate the assembly between the digital micromirror device 22 and the insert 201. At the same time, the assembly gap between the two should not be too large, and is preferably 0.05 to 0.01 mm.

In some embodiments, the third positioning hole 222C and the fourth positioning hole 222D may be blind holes. After the assembly is completed, the top of the third positioning post 2011C and the bottom of the third positioning hole 222C do not contact, and the top of the fourth positioning post 2011D and the bottom of the fourth positioning hole 222D do not contact. The purpose is that when the insert abuts against the mechanical abutting component 2222 of the digital micromirror device 22 tightly, the mechanical and electrical stability of the digital micromirror device abutting against the insert will not be affected by the contact between the positioning holes and the positioning posts.

The second surface 2012 is provided with a fifth positioning post 2012C and a sixth positioning post 2012D. Correspondingly, as shown in FIG.7A, the circuit board 231 is provided with a fifth positioning hole 23103C and a sixth positioning hole 23103D. Specifically, the fifth positioning post 2012C and the fifth positioning hole 23103C are correspondingly disposed, and the sixth positioning post 2012D and the sixth positioning hole 23103D are correspondingly disposed.

In some embodiments, the third positioning post 2011C and the fifth positioning post 2012C are oppositely disposed on both sides of the insert 201. The fourth positioning post 2011D and the sixth positioning post 2012D are oppositely disposed on both sides of the insert 201.

In some embodiments, the fifth positioning post 2012C is a prism, the fifth positioning hole 23103C is a circular hole; the sixth positioning post 2012D is a cylinder, and the sixth positioning hole 23103D is a circular hole. The size of the fifth positioning hole 23103C is larger than the size of the fifth positioning post 2012C, and the size of the sixth positioning hole 23103D is larger than the size of the sixth positioning post 2012D, in order to facilitate the assembly between the circuit board and the insert 201. At the same time, the assembly gap between the two should not be too large, is preferably 0.05-0.01 mm After the circuit board assembly 23 and DMD 22 are fixedly assembled by the pressing plate, the first positioning post 2121A is located in the positioning hole221A, and the second positioning post 2121B is located in the positioning hole 221B. The mechanical abutting component 2212 abuts against the abutting pad 2122A, the abutting pad 2122B, and the abutting pad 2122C. The third positioning post 2011C is located in the third positioning hole 222C, and the fourth positioning post 2011D is located in the fourth positioning hole 222D. The fifth positioning post 2012C is located in the fifth positioning hole 23103C, and the sixth positioning post 2012D is located in the sixth positioning hole 23103D. The plurality of third electrical contact points 20111 disposed on the first surface 2011 are electrically connected with the plurality of first electrical contact points 22221, respectively. The plurality of fourth electrical contact points 20121 disposed on the second surface 2012 are electrically connected with the plurality of second electrical contact points 23111, respectively. At the same time, the second surface 222 of the insert abutting against the digital micromirror device 22 includes a mechanical abutting area 2222. The circuit board 23 abuts against the insert 201. At the same time, mechanical abutment and good point-contact are realized.

In some embodiments, the third electrical contact points and the fourth electrical contact points of the insert are elastic contact points. Compared with the direct contact of the flat contact points of between the circuit board and the digital micromirror device, the circuit board is in contact with the digital micromirror device via the insert, and elastic contact points are provided on the surfaces of the insert, so that when the second electrical contact points on the surface of the circuit board are in contact with the electrical contact points on the surfaces of the digital micromirror device and the circuit board, a sufficient contact may be ensured by elastic deformation, thereby stabilizing signal transmission between the circuit board assembly and the digital micromirror device.

Figure 11:
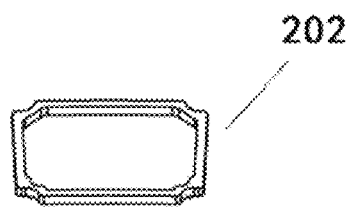
FIG. 11 is a schematic structural view of a first sealing piece of a light machine of a digital light processing projector, in accordance with one or more embodiments.

FIG. 11 is a schematic structural view of a first sealing piece of a light machine of a digital light processing projector in accordance with one or more embodiments. In some embodiments, the periphery of the digital micromirror device is provided with a first sealing piece 202, the sealing piece structures are shown in FIG. 11. Specifically, the first sealing piece 202 is an elastic sealing piece, and may be made of foam, rubber, or the like. In particular, the first sealing piece 202 is disposed around the digital micromirror device 22 and the insert 201, and between the circuit board 231 and the shell 21 of the light machine. Specifically, the first sealing piece 202 is disposed at the position of the first groove 211. After being fixedly assembled by the pressing plate, the circuit board assembly 23 and the DMD 22 are pressed between the circuit board and the shell 21 in a compressed state, and one side of the first sealing piece 202 abuts against the shell 21 and the other side abuts against the circuit board 23. The first sealing piece 202 is a sealing ring that prevents dust from entering the shell 21 through the first through hole 212, thereby ensuring that the reflective lens component in the digital micromirror device 22 is free from dust and the like.

In some embodiments, a first connection assembly 205 is included for fixedly connecting the pressing plate 24 with the shell 21. Further, the circuit board assembly 23 and the DMD 22 are fixed and pressed onto the shell 21 by a pressing plate. The first connection assembly 205 may apply a force to the pressing plate 24 in a direction toward the shell 21.

The first connection assembly 205 includes four first screws. After passing through the pressing plate 24 and the circuit board 231, the four first screws are threadedly connected to the shell 21. Specifically, the four corners of the first groove 211 of the shell 21 are respectively provided with a screw hole 2111A, a screw hole 2111B, a screw hole 2111C, and a screw hole 2111D. The first screws are disposed in one-to-one correspondence with the screw holes for threaded connection.

Specifically, the pressing plate is provided with pressing plate screw through portions. The screw through portions are used for allowing part of the screws to pass through, and the screw through portions should enable the screw nuts of the screws to be limited at one side of the pressing plate and cannot pass through to the other side.

Figure 8:
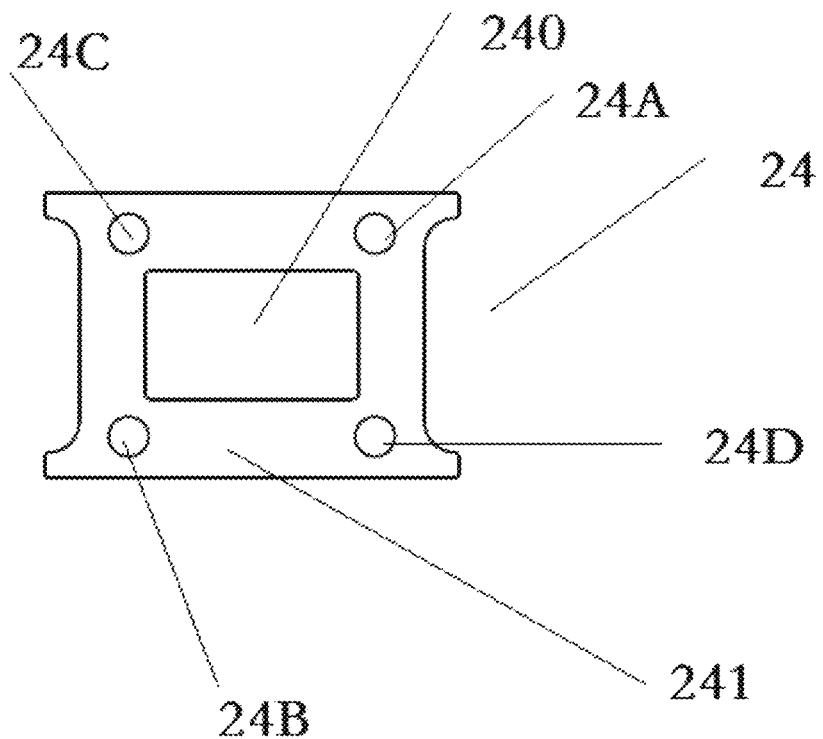
FIG. 8 is a schematic structural view of a pressing plate of a light machine of a digital light processing projector, in accordance with one or more embodiments.

FIG. 8 is a schematic structural view of a pressing plate of a light machine of a digital light processing projector in accordance with one or more embodiments. As shown in FIG. 8, the pressing plate screw through portions may include screw through holes 24A, 24B, 24C, and 24D for the four screws to pass through. The four screw through holes are smaller in size than the nuts of the corresponding screws. Therefore, the nuts of the screws will be limited at the through holes to apply force to the pressing plate. In some embodiments, the screw through holes on the pressing plate may be configured as half holes.

In some embodiments, the circuit board is provided with first circuit board screw through portions. The first circuit board screw through portions are used for allowing part of the screws to pass through.

Specifically, as shown in FIG.7A, the first circuit board screw through portions may include screw through holes 23102A, 23102B, 23102C, and 23102D for the four first screws to pass through. In some embodiments, the circuit board screw through portions may be configured as half holes.

In some embodiments, the first connection assembly 205 includes first screws and a first elastic component. The first screws 2051 pass through the screw through holes of the pressing plate 24 and are then threadedly connected with the shell. The first elastic component is located between the nuts of the first screws and the pressing plate. Compared with the solution in which only screws are used, since the first elastic component is disposed between the nuts of the screws and the pressing plate, the elastic force of the first elastic components to the pressing plate may be adjusted by adjusting the compression amount of the first screws to the first elastic components after the first screws are fixed with the corresponding screw holes, so that the locking force of the first screws to the pressing plate, the circuit board assembly and the digital micromirror device may be controllably adjusted. In addition, the first elastic components may also make the fit between the first screws and the screw through holes tighter and greatly reduce the possibility of the looseness of the first screws, thereby improving the connection reliability of the pressing plate, the circuit board, the insert, the digital micromirror device and the shell.

The digital light processing projector in one or more embodiments includes a heat dissipater 25, which is in thermal contact with the heat dissipating area 2221 of the digital micromirror device 22.

The heat dissipater 25 is disposed on the plane of the circuit board and spaced apart from the circuit board 231. Preferably, in some embodiments, the circuit board assembly 23 is provided with a second through hole 230 through which the heat dissipater 25 is in thermal contact with the heat dissipating area 2221 of the digital micromirror device 22.

The heat dissipater 25 is disposed on the plane of the pressing plate and spaced apart from the pressing plate. Preferably, in some embodiments, the pressing plate 24 is provided with a third through hole 240 through which the heat dissipater 25 is in thermal contact with the heat dissipating area 2221 of the digital micromirror device 22.

The heat dissipater 25 includes a heat conducting component 251 and a heat dissipating component 252 that are connected to each other. The heat dissipating component 252 and the heat conducting component 251 pass through the third through hole 240 of the pressing plate 24, the second through hole 230 of the circuit board 23, and the through hole 2010 of the insert 201 in turn. Thereafter, it is in contact with the heat dissipating area 2221 of the digital micromirror device 22.

In some embodiments, through holes are respectively provided on the pressing plate, the circuit board and the insert corresponding to the heat dissipating area 2221 of the digital micromirror device 22, so that the heat conducting component 251 passes through each through holes, thus realizing the thermal contact between the heat dissipater 25 and the heat dissipating area 2221, solving the problem of inconvenient contact due to other components between the heat dissipater 25 and the digital micromirror device 22, and ensuring good heat dissipation of the digital micromirror device 22. Furthermore, since the heat conducting component 251 passes through the pressing plate, the second through hole 230 of the circuit board 23 and the through hole 2010 of the insert 201, the structure of the assembly may be made more compact and the occupied space may be reduced.

It should be noted that the heat conducting component 251 of the heat dissipater 25 may be indirectly contacted with the heat dissipating area 2221 through the thermal paste, that is, a gap of about 0.1 mm needs to be reserved between the heat dissipater 25 and the heat dissipating area 2221 for filling the heat conductive paste. The size of the gap between the heat conductor and the heat dissipating area directly affects the heat dissipation of the digital micromirror device. If the gap is too large, the heat conductive paste may not be able to transfer the heat of the digital micromirror device to the heat dissipater to the maximum extent, thus causing damage to the digital micromirror device easily.

The heat dissipating area 2221 of the digital micromirror device 22 may be located in the middle of the digital micromirror device 22, and the mechanical abutting area 2222 of the digital micromirror device 22 is located around the heat dissipating area 2221. By such arrangement, when the mechanical abutting area 2222 receives a larger locking force of the first connection assembly, the force of the digital micromirror device 22 may be ensured to be uniform.

In some embodiments, a second connection assembly 207 is included for fixing the heat dissipater 25 to the shell 21 of the light machine.

The second connection assembly 207 includes four second screws. The peripheral screw posts of the first groove 211 of the shell 21 are disposed for the fixation of the heat dissipater 25. The screw posts 213 include screw posts 213A, 213B, 213C, and 213D. The screw posts 213 protrude outward from the shell 21 and passes through the circuit board 231. The second screws are arranged in one-to-one correspondence with the screw posts for threaded connection.

Specifically, the circuit board is provided with screw post through portions. The screw post through portions on the circuit board are used for allowing the screw posts to pass through. Specifically, the screw post through portions may include screw post through holes 23101A, 23101B, 23101C, and 23101D for the screw posts to pass through. In some embodiments, the screw post through portions may be configured as half holes.

Figure 9A:
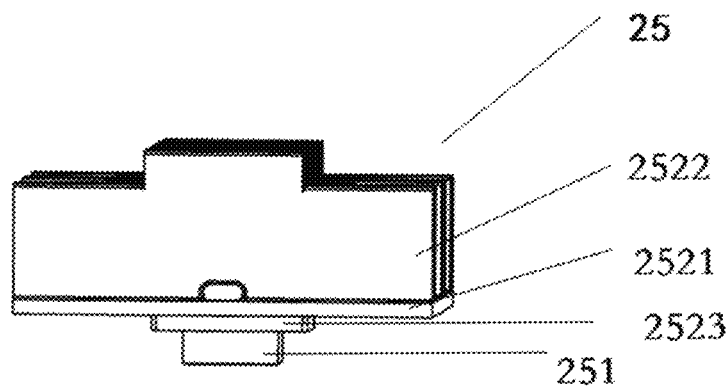
FIG. 9A is a schematic structural view of a heat dissipater of a light machine of a digital light processing projector, in accordance with one or more embodiments.
Figure 9B:
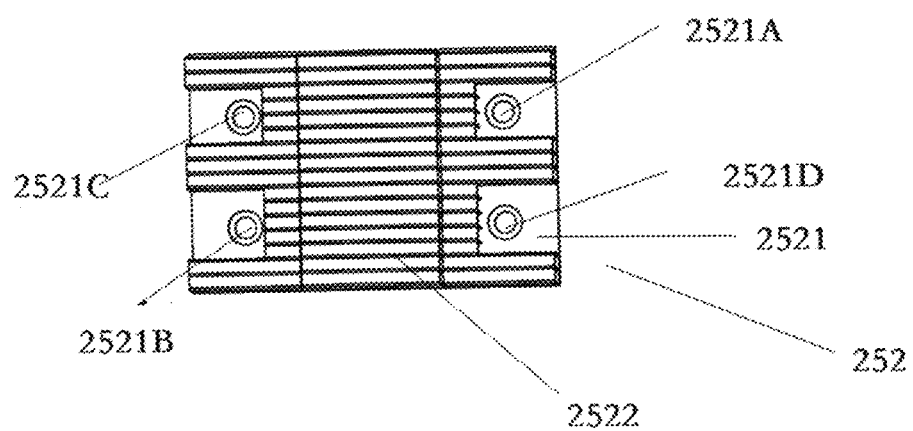
FIG. 9B is a schematic back view showing structures of a heat dissipater of a light machine of a digital light processing projector, in accordance with one or more embodiments.
Figure 9C:
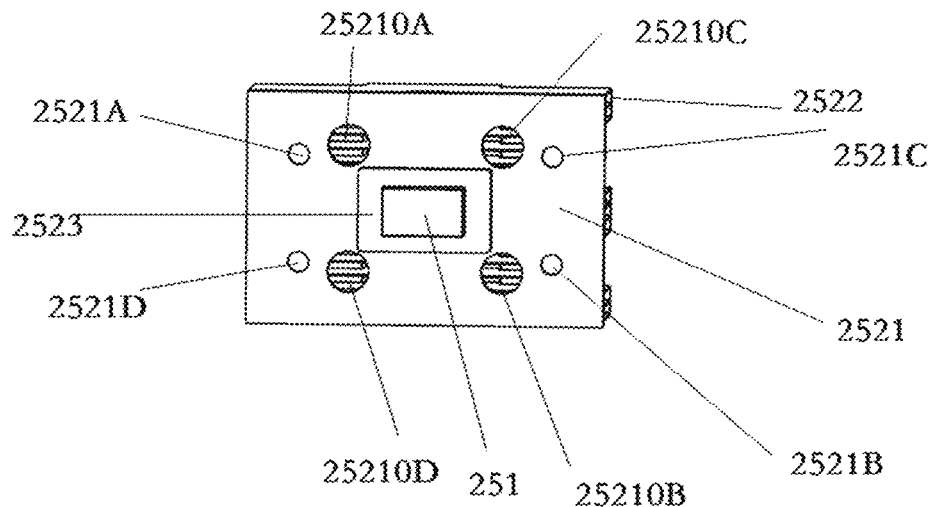
FIG. 9C is a schematic front view showing structures of a heat dissipater of a light machine of a digital light processing projector, in accordance with one or more embodiments.

FIG. 9A, FIG. 9B and FIG. 9C are a schematic structural view, back view and a front view of a heat dissipater of a light machine of a digital light processing projector in accordance with one or more embodiments. As shown in FIGS. 9A-9C, in some embodiments, the heat dissipater 25 includes a heat conducting component 251 and a heat dissipating component 252. More specifically, the heat dissipating component 252 includes a heat dissipating substrate 2521 and heat dissipating fins 2522. After the heat dissipater 25 is installed, the screw posts 213 abut against the heat dissipating substrate 2521. The heat dissipating substrate 2521 is provided with screw holes 2521A, 2521B, 2521C, and 2521D. After passing through the screw holes, the four second screws are respectively fixed with the four screw posts.

In some embodiments, the heat dissipating substrate 2521 is further provided with four first screw through holes 25210A, 25210B, 25210C, and 25210D to make room for the first screws, so that the first screws may be partially embedded into the heat dissipater under the condition that the first screws are not in contact with the heat dissipater, thereby further saving installation space.

In some embodiments, the second connection assembly 207 includes second screws and second elastic component. The second screws pass through the screw through holes of the heat dissipater 25 and are then screwed to the shell. The second elastic component is located between the nuts of the second screws and the heat dissipater 25. Compared with the solution in which only screws are used, since the second elastic component is disposed between the nuts of the screws and the heat dissipater, the elastic force of the second elastic component to the heat dissipater may be adjusted by adjusting the compression amount of the second screws to the second elastic component after the second screws are fixed with the corresponding screw posts, so that the locking force of the second screws to the heat dissipater and the digital micromirror device may be controllably adjusted. In addition, the second elastic component may also make the fit between the second screws and the screw through holes tighter and greatly reducing the possibility of the looseness of the second screws, thereby improving the connection reliability of the heat dissipater and the shell.

In some embodiments, the shell is provided with the first through hole, the first surface of the digital micromirror device abuts against the shell, and the reflective lens component is provided at the position correspondingly to the first through hole on the first surface. When a force is applied to the digital micromirror device to move the digital micromirror device toward the direction close to the shell, the shell will play a limiting role on the digital micromirror device to prevent the digital micromirror device from moving in the direction close to the shell, so that the reflective lens component and the shell may be keep fixed, thereby ensuring the accuracy of light reflection by the reflective lens component, and further enabling the digital light processing projector to stably project images.

Since the second surface of the digital micromirror device comprises a mechanical abutting area and a heat dissipating area, the second surface is opposite to the first surface, and the mechanical abutting area is provided with a plurality of first electrical contact points, the circuit board assembly is disposed close to the second surface of the digital micromirror device, and the circuit board assembly is provided with a plurality of second electrical contact points located correspondingly to the plurality of first electrical contact points. The first connection assembly is may apply a force to the circuit board assembly to move the circuit board assembly towards the shell through the pressing plate, so that by adjusting the magnitude of the force applied by the first connection assembly to the circuit board assembly that move the circuit board assembly towards the shell, i.e. adjusting the force born by the mechanical abutting area, thus the second electrical contact points is fully contacted with the first electrical contact points, thereby ensuring a stable signal transmission between the circuit board assembly and the digital micromirror device.

Since the heat dissipater is in thermal contact with the heat dissipating area of the digital micromirror device and is spaced apart from the pressing plate and the circuit board assembly, the force applied by the heat dissipater to the digital micromirror device only acts on the heat dissipating area. The second connection assembly may apply a force to the heat dissipater to move the heat dissipater towards the direction close to the digital micromirror device, so that the magnitude of the force applied to the heat dissipater by the second connection assembly may be adjusted, that is, the magnitude of the force applied to the heat dissipating area may be adjusted by adjusting the contact tightness between the heat dissipater and the heat dissipating area, thus the heat dissipater may fully radiate the heat dissipating area, and an excessive force applied to the heat dissipating area may be avoided.

According to the fixing structure of the digital micromirror device in the digital light processing projector provided by one or more embodiments, the magnitude of the force applied on the mechanical abutting area and the heat dissipating area is adjusted respectively through two groups of connecting assemblies, so that the requirement of the force applied on the mechanical abutting area and the heat dissipating area may be met simultaneously, that is: the force applied on the mechanical abutting area is adjusted to an appropriate value through the first connection assembly, the signal transmission between the circuit board assembly and the digital micromirror device is ensured to be stable, the digital micromirror device and the shell are fixed well, thus may avoid the influence on light reflection caused by looseness of the digital micromirror device and the shell. By adjusting the force applied on the heat dissipating area to an appropriate value through the second connection assembly, not only the heat dissipating area may avoid a broken due to excessive force, but also the heat dissipating area may be fully radiated.

In some embodiments, in order for the pressing plate to uniformly press the circuit board, the insert, and the digital micromirror device, the first screws are provided with multiple and uniformly distributed on the pressing plate, the plurality of first screws are shoulder screws, the first elastic components is sleeved between the shoulders and the heads of the first screws, and the distances between the shoulders and the heads of the plurality of first screws are equal. By providing a plurality of first screws on the pressing plate and making the distances between the shoulders of the plurality of first screws and the nuts equal, and making the shoulders of the first screws abut against the pressing plate when the first screws are tightened, the compression amount of the first elastic components sleeved on the shaft shoulders of each first screws may be ensured to be equal, and the elastic forces applied by each of the first elastic components to the pressing plate may be easily kept equal. Therefore, the pressing force applied by the pressing plate to the circuit board, the insert and the digital micromirror device is more uniform, so that all parts of the circuit board, the insert and the digital micromirror device may be fully contacted, and further the signal transmission between the circuit board and the digital micromirror device may be more stable.

The number of the first screws may be two, four, six, etc., which is not specifically limited herein. When the number of the first screws is four, i.e. two pairs, the two first screws in each pair may be symmetrically disposed on both sides of the center line of the pressing plate along the length direction or the width direction.

In some embodiments, in order to make the force applied on the heat dissipater uniform to ensure the uniform contact between the heat conductor and the heat dissipating area, the second screws are multiple and uniformly distributed on the heat dissipater, and the plurality of second screws are shoulder screws, the second elastic components are sleeved between the shoulders and the nuts of the second screws, and the distances between the shoulders and the nuts of the plurality of second screws are equal. By providing a plurality of second screws on the pressing plate and making the distances between the shoulders of the plurality of second screws and the nuts equal, and making the shoulders of the second screws abut against the pressing plate when the second screws are tightened, the compression amount of the second elastic components sleeved on the shaft shoulders of each second screws may be ensured to be equal, and the elastic forces applied by each of the second elastic component to the pressing plate may be easily kept equal. Therefore, the force applied on the heat dissipater is more uniform, the inclination of the heat dissipater due to uneven force may be avoided, the contact between the heat conductor and the heat dissipating area of the digital micromirror device may be more uniform, and the heat dissipation effect of the heat dissipater may be further improved.

The number of the second screws may be two, four, six, etc., which is not specifically limited herein. When the number of the second screws is four, i.e. two pairs, the two second screws in each pair may be symmetrically disposed on both sides of center line of the heat dissipater component along the length direction or the width direction; the nuts of the second screws may be embedded into the heat dissipater 25 or be attached to the surface of the heat dissipater 25, which is not specifically limited herein.

In the fixing structure of the digital micromirror device in the digital light processing projector provided by one or more the embodiments, the type of the first elastic components and the second elastic components are not unique, for example, the first elastic components and the second elastic components may be both rubber rings or elastic washers. Preferably, the first elastic components and the second elastic components may also both be springs. Compared to rubber rings and elastic washers, the elasticity of the spring is better, which is beneficial to improving the anti-loosening effect of the first screws and the second screws.

In the fixing structure of the digital micromirror device in the digital light processing projector provided by one or more embodiments, the material of the pressing plate is not unique, for example, the pressing plate may be a plastic plate.

In some embodiments, the pressing plate 24 is a metal plate (such as a stainless steel plate, an aluminum plate, etc.). The second surface 232 of the circuit board 23 is provided with a ground point 2321, as shown in FIG. 7B. A conductive pad 204 is disposed between the ground point 2321 and the pressure plate 24 for realizing electrical connection between the ground point 2321 and the pressure plate 24. Thereby, realizing grounding of the circuit board 23.

At the same time, in order to prevent the circuit board 32 from being short-circuited caused by the direct contact between the pressing plate 41 and other parts of the circuit board 32, an insulation pad 203 is provided between the pressing plate 24 and the circuit board 231. The rigidity and flatness of the metal plate are better, and the deformation of the metal plate under the action of the first connection assembly is smaller, so that the pressing plate may flatly press the insert, the circuit board and the digital micromirror device, thus being beneficial to the full connect between the insert, the circuit board and the digital micromirror device, and further being beneficial to the stabile of the signal transmission between the circuit board and the digital micromirror device. At the same time, the grounding of the circuit board 231 is realized through the electrical connection between the ground point 2321 and the pressing plate.

In some embodiments, insulation pad 203 is an elastic insulation pad such as a rubber pad or the like. The conductive pad 204 is an elastic conductive pad, such as a conductive foam or the like. The pressure of the first connection assembly received by the pressing plate 24 may be more uniformly transmitted to the circuit board by an elastic insulation pad. At the same time, an elastic conductive pad may also ensure a good electrical connection between the pressing plate and the ground point.

In some embodiments, the ground point is disposed on the periphery of the second through hole 2310 of the circuit board 231. A conductive pad 204 is disposed between the ground point 2321 and the pressing plate 24. The insulation pad 203 is disposed on the periphery of the conductive pad 204. The pressure of the first connection assembly received by the pressing plate 24 may be more uniformly transmitted to the circuit board by providing the insulation pad 203 on the periphery.

In some embodiments, a second sealing piece is provided between the mechanical abutting surface of the first surface of the digital micromirror device and the shell. Specifically, the second sealing piece is an elastic sealing piece, which may be made of foam, rubber or other materials. The second sealing piece may be a sealing ring. One side of the second sealing piece abuts against the mechanical abutting component on the first surface and is located around the reflective lens component, and the other side abuts against the shell, which may prevent dust from entering the shell 21 from the first through hole 212, thereby ensuring that the reflective lens component on the digital micromirror device 22 is free from dust and the like.

In some embodiments, a third sealing piece 206 is disposed on the periphery of the heat conductor 251 to seal the thermal contact region of the digital micromirror device between the heat dissipating area 2221 and the heat conductor 251. Specifically, the third sealing piece is an elastic sealing piece, which may be made of foam, rubber, or the like. The third sealing piece may be a sealing ring, with one side abutting against the heat dissipater component 252 and the other side abutting against the pressing plate 24. It may prevent dust from entering the thermal contact surface and affecting the thermal conductivity. In some embodiments, the material of the third sealing piece is foam. Compared with rubber, the elastic deformation of the foam material is larger, which is more conducive to ensuring the relative distance between the heat conductor and the heat dissipating area of the digital micromirror device, and achieving good thermal contact. Moreover, the elastic coefficient of the foam is relatively smaller, so that excessive pressure is not applied to the pressing plate due to the compression of the third sealing piece.

In some embodiments, the heat dissipating substrate 2521 is provided with a heat dissipation boss 2523, and the heat conductor is disposed on the heat dissipating boss. A third sealing piece 206 is disposed on the periphery of the heat conductor 251. The third sealing piece may be a sealing ring, with one side abutting against the heat dissipating boss 2523 and the other abutting against the pressing plate 24. Since the height of the screw posts 213 determines the height difference between the heat dissipating substrate and the pressing plate, by providing the heat dissipating boss 2523, the thickness of the third sealing piece 206 may be reduced, which is more advantageous for the realization of sealing.

Since the digital light processing projector provided by one or more embodiment includes the fixing structure of the digital micromirror device of the digital light processing projector in any of the above embodiments, the same technical effect can be produced and the same technical problem can be solved. Other structures of the digital light processing projector are well known to those skilled in the art and will not be redundantly described herein.

The above description refers to specific embodiments, but the scope of the present invention is not limited thereto. Any variation or substitution which a person skilled in the art can easily envisage, should be encompassed in the scope of protection of the present invention. Therefore, the scope of protection of the present invention should be determined by the scope of protection of the claims.

In the description of the present disclosure, terms "a first" and "a second" are used only for descriptions and shall not be understood as indicating or implying relative importance or implying a number of the indicated technical features. Thus, elements limited by "a first" and "a second" may explicitly or implicitly include one or more features. In the descriptions of the present disclosure, "a plurality" refers to two or more unless otherwise stated clearly.

In the descriptions of the present specification, terms such as "an example", "some examples", "illustrative examples", "embodiments", "a specific example" or "some examples" are intended to refer to that a specific feature, structure, material, or characteristic described in combination with an embodiment or an example are included in at least one embodiment or example of the present disclosure. In the present specification, the illustrative expressions of the above terms do not necessarily refer to a same embodiment or example. Further, specific feature, structure, material or characteristic described above may be combined in a proper way in one or more embodiments or examples.

The foregoing disclosure is merely illustrative of some examples of the present disclosure but not intended to limit the present disclosure, and any modifications, equivalent substitutions, adaptations thereof made within the spirit and principles of the disclosure shall fall within the scope of the present disclosure.

The invention claimed is:

1. A digital light processing projector, comprising: a light source device, a light machine, and a lens device, wherein the light machine comprises:
   a shell, provided with a first through hole;
   a digital micromirror device having a first surface and a second surface, the first surface of the digital micromirror device is provided with a mechanical abutting component, the mechanical abutting component abuts against the shell, the second surface of the digital micromirror device is disposed opposite to the first surface of the digital micromirror device, and the second surface of the digital micromirror device is provided with first electrical contact points;
   a circuit board assembly, wherein the circuit board assembly comprises a circuit board, a first surface of the circuit board faces the second surface of the digital micromirror device, the first surface of the circuit board is provided with second electrical contact points, and the second electrical contact points are electrically connected with the first electrical contact points;
   a pressing plate, with an insulative pad disposed between the pressing plate and the circuit board; and
   a first connection assembly for fixed connection with the shell, and fixation of the pressing plate, the circuit board assembly and the digital micromirror device on the shell,
   wherein
   the shell is provided with a first positioning post and a second positioning post,
   the digital micromirror device is provided with a first positioning hole and a second positioning hole,
   the first positioning post is located in the first positioning hole, and
   the second positioning post is located in the second positioning hole.

2. The digital light processing projector according to claim 1, wherein:
   the first surface of the digital micromirror device is provided with a reflective lens component, and the reflective lens component faces an interior of the digital light processing projector through the first through hole.

3. The digital light processing projector according to claim 1, further comprising:
   an insert, disposed between the circuit board and the digital micromirror device for electrically connecting the second electrical contact points to the first electrical contact points.

4. The digital light processing projector according to claim 3, wherein:
   the insert is provided with a first surface opposite to the second surface of the digital micromirror device; the first surface of the insert is provided with a third positioning post and a fourth positioning post;
the digital micromirror device is provided with a third positioning hole and a fourth positioning hole;
the third positioning post is located in the third positioning hole, the fourth positioning post is located in the fourth positioning hole.

5. The digital light processing projector of claim 4, wherein:
the insert further comprises a second surface opposite to the first surface of the insert;
the second surface of the insert is provided with a fifth positioning post and a sixth positioning post;
the circuit board is provided with a fifth positioning hole and a sixth positioning hole;
the fifth positioning post is located in the fifth positioning hole, the sixth positioning post is located in the sixth positioning hole.

6. The digital light processing projector according to claim 5, wherein the digital micromirror device is provided with a positioning chamfer, and the third positioning hole and the fourth positioning hole are respectively located at adjacent corners of the positioning chamfer.

7. The digital light processing projector according to claim 5, wherein the third positioning post and the fifth positioning post are oppositely disposed, and the fourth positioning post and the sixth positioning post are oppositely disposed.

8. The digital light processing projector according to claim 4, wherein the digital micromirror device is provided with a positioning chamfer, and the third positioning hole and the fourth positioning hole are respectively located at adjacent corners of the positioning chamfer.

9. The digital light processing projector according to claim 1, wherein the digital micromirror device is provided with a positioning chamfer, the first positioning hole is located at the positioning chamfer of the digital micromirror device, and the second positioning hole is located at an opposite corner of the positioning chamfer of the digital micromirror device.

10. The digital light processing projector according to claim 1, wherein:
the circuit board assembly is provided with a second through hole;
the pressing plate is provided with a third through hole;
the second surface of the digital micromirror device is provided with a heat dissipating area; and
the light machine further comprises:
a heat dissipater, passing through the second through hole and the third through hole, and in thermal contact with a heat dissipating area of the digital micromirror device; and
a second connection assembly for fixing the heat dissipater on the shell.

11. The digital light processing projector according to claim 1, further comprising:
an insert, disposed between the circuit board and the digital micromirror device for electrically connecting the second electrical contact points to the first electrical contact points.

12. The digital light processing projector according to claim 11, wherein:
the insert is provided with a first surface opposite to the second surface of the digital micromirror device;
the first surface of the insert is provided with a third positioning post and a fourth positioning post;
the digital micromirror device is provided with a third positioning hole and a fourth positioning hole; and
the third positioning post is located in the third positioning hole, the fourth positioning post is located in the fourth positioning hole.

13. The digital light processing projector of claim 12, wherein:
the insert further comprises a second surface opposite to the first surface of the insert;
the second surface of the insert is provided with a fifth positioning post and a sixth positioning post;
the circuit board is provided with a fifth positioning hole and a sixth positioning hole;
the fifth positioning post is located in the fifth positioning hole, the sixth positioning post is located in the sixth positioning hole.

14. The digital light processing projector according to claim 13, wherein the digital micromirror device is provided with a positioning chamfer, and the third positioning hole and the fourth positioning hole are respectively located at adjacent corners of the positioning chamfer.

15. The digital light processing projector according to claim 13, wherein the third positioning post and the fifth positioning post are oppositely disposed, and the fourth positioning post and the sixth positioning post are oppositely disposed.

16. The digital light processing projector according to claim 12, wherein the digital micromirror device is provided with a positioning chamfer, and the third positioning hole and the fourth positioning hole are respectively located at adjacent corners of the positioning chamfer.

17. The digital light processing projector according to claim 1, wherein,
a second surface of the circuit board is provided with a ground point;
the pressing plate at least comprises a conductive component, which is electrically connected to the ground point through a conductive pad.

18. A digital light processing projector, comprising: a light source device, a light machine, an insert, and a lens device, wherein the light machine comprises:
a shell, provided with a first through hole;
a digital micromirror device having a first surface and a second surface, the first surface of the digital micromirror device is provided with a mechanical abutting component, the mechanical abutting component abuts against the shell, the second surface of the digital micromirror device is disposed opposite to the first surface of the digital micromirror device, and the second surface of the digital micromirror device is provided with first electrical contact points;
a circuit board assembly, wherein the circuit board assembly comprises a circuit board, a first surface of the circuit board faces the second surface of the digital micromirror device, the first surface of the circuit board is provided with second electrical contact points, and the second electrical contact points are electrically connected with the first electrical contact points;
a pressing plate, with an insulative pad disposed between the pressing plate and the circuit board; and
a first connection assembly for fixed connection with the shell, and fixation of the pressing plate, the circuit board assembly and the digital micromirror device on the shell,
wherein
the insert is disposed between the circuit board and the digital micromirror device for electrically connecting the second electrical contact points to the first electrical contact points, the insert is provided with a first surface opposite to the second surface of the digital micromirror device, the first surface of the insert is provided with a third positioning post and a fourth positioning post, the digital micromirror device is provided with a third positioning hole and a fourth positioning hole, and the third positioning post is located in the third positioning hole, and the fourth positioning post is located in the fourth positioning hole.

19. A digital light processing projector, comprising: a light source device, a light machine, and a lens device, wherein the light machine comprises:

a shell, provided with a first through hole;

a digital micromirror device having a first surface and a second surface, the first surface of the digital micromirror device is provided with a mechanical abutting component, the mechanical abutting component abuts against the shell, the second surface of the digital micromirror device is disposed opposite to the first surface of the digital micromirror device, and the second surface of the digital micromirror device is provided with first electrical contact points;

a circuit board assembly, wherein the circuit board assembly comprises a circuit board, a first surface of the circuit board faces the second surface of the digital micromirror device, the first surface of the circuit board is provided with second electrical contact points, and the second electrical contact points are electrically connected with the first electrical contact points;

a pressing plate, with an insulative pad disposed between the pressing plate and the circuit board; and a first connection assembly for fixed connection with the shell, and fixation of the pressing plate, the circuit board assembly and the digital micromirror device on the shell, wherein a second surface of the circuit board is provided with a ground point, and the pressing plate at least comprises a conductive component, which is electrically connected to the ground point through a conductive pad.

\* \* \* \* \*